Dec. 7, 1926.
F. E. SMITH
1,609,783
ENDLESS TRACK BASE
Original Filed Sept. 21, 1922  2 Sheets-Sheet 1
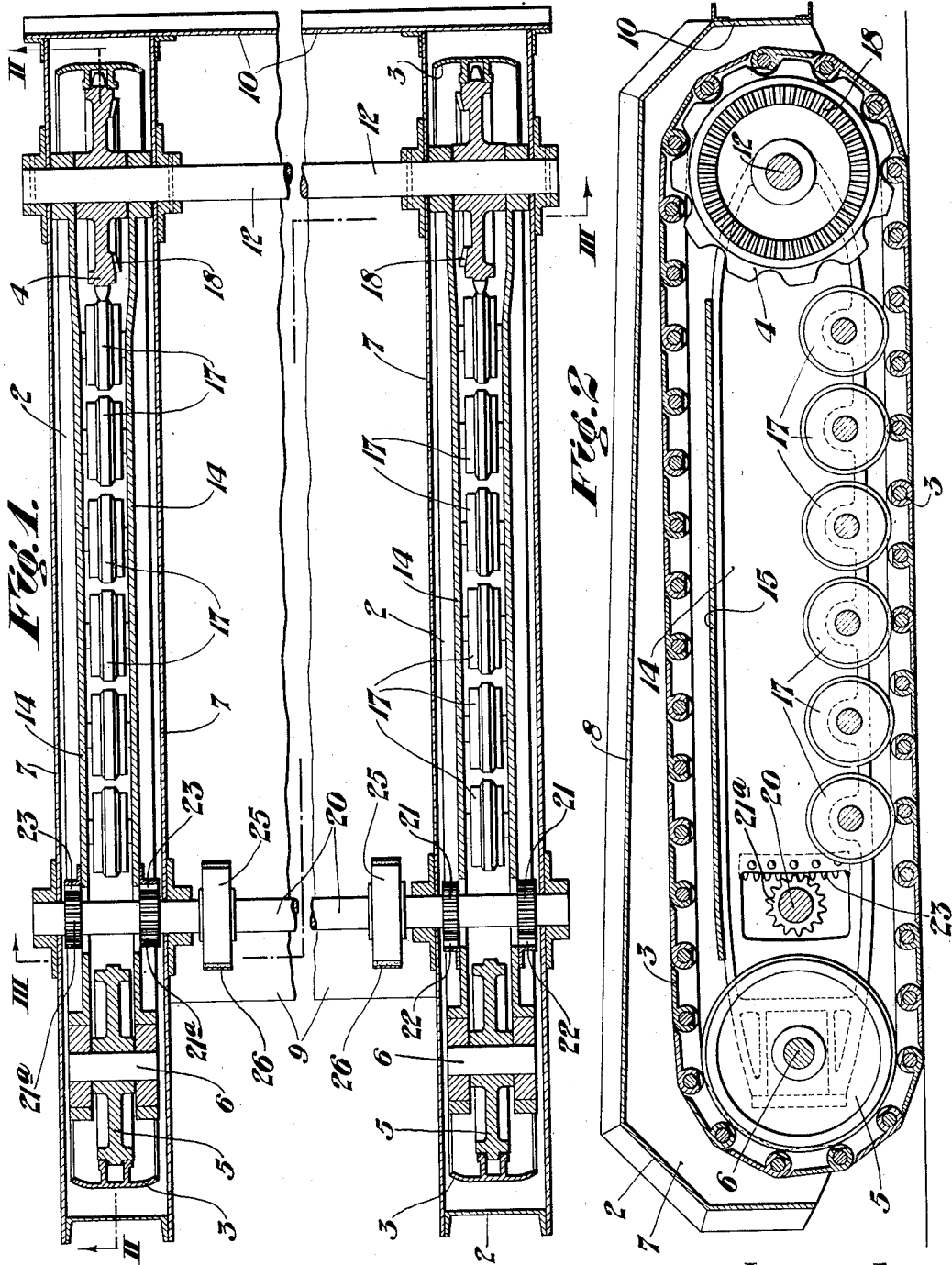
Witnesses:
Edwin Trueb
Inventor:
FRANK E. SMITH,
by: D. Anthony Usina
his Attorney.

Dec. 7, 1926.                                              1,609,783
                         F. E. SMITH
                      ENDLESS TRACK BASE
            Original Filed Sept. 21, 1922    2 Sheets-Sheet 2

Witnesses:                                    Inventor:
  Edwin Truel                              FRANK E. SMITH,
                                      by: D. Anthony Usina
                                                     his Attorney.

Patented Dec. 7, 1926.

1,609,783

UNITED STATES PATENT OFFICE.

FRANK E. SMITH, OF SCOTTDALE, PENNSYLVANIA.

ENDLESS-TRACK BASE.

Original application filed September 21, 1922, Serial No. 589,515. Divided and this application filed July 7, 1923. Serial No. 650,013.

This invention relates to endless track bases for use with loading machines, cranes or other heavy traveling machines, and while not limited thereto, relates more particularly to a base for loading machines adapted to load coal and other mined material within a mine, such as described in my co-pending application, Serial No. 589,515, filed September 21, 1922, which has resulted in Patent No. 1,466,917, dated September 4, 1923, of which this application is a division.

One object of this invention is to provide an endless track base embodying a three-point suspension for the main frame which may, when desired, be locked to form a four-point suspension.

Another object is to provide a main frame suspension which embodies a novel form of equalizing mechanism whereby the upward movement of one crawler will impart a downward movement of the other crawler.

A further object is to provide an endless track base of this class having the novel construction, design and combination of parts hereinafter described and illustrated in the accompanying drawings, in which—

Figure 1 is a sectional plan of a base embodying this invention.

Figure 2 is a longitudinal vertical section on the line II—II of Figure 1.

Figure 3:
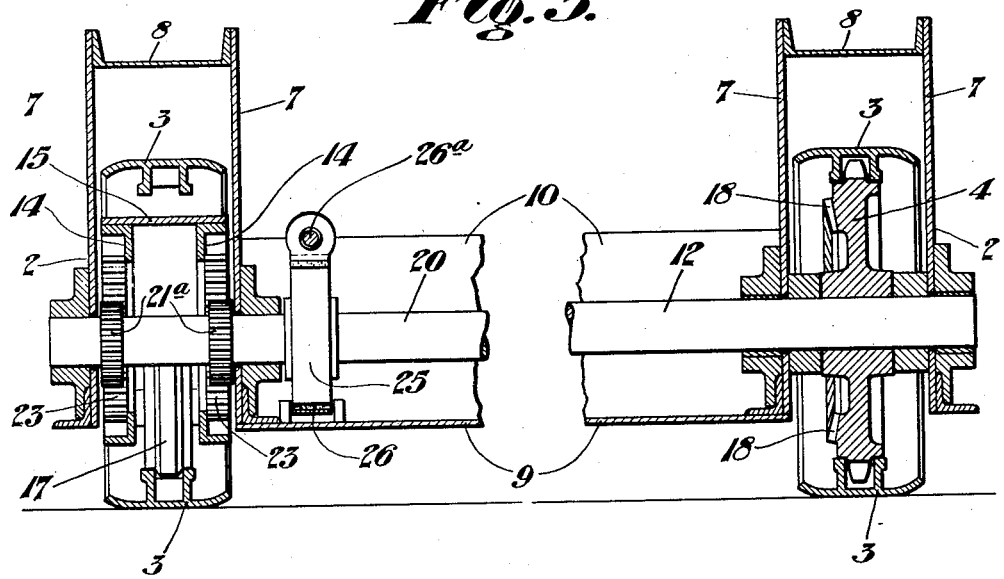
Figure 3 is a transverse vertical section on the lines III—III of Figure 1.
Figure 4:
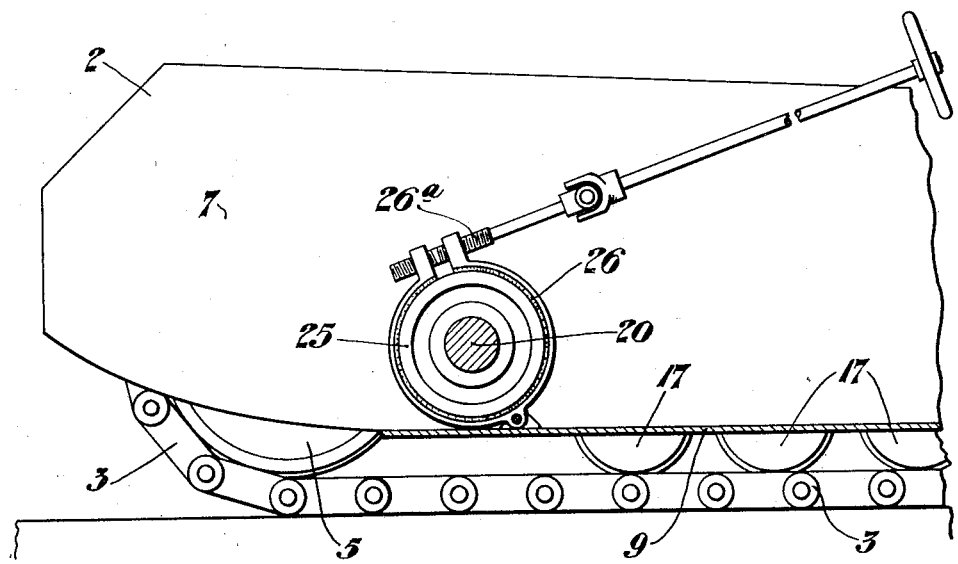
Figure 4 is a fragmentary sectional elevation illustrating the brake or locking device.

Referring more particularly to the drawings, the numeral 2 designates the structural base frame adapted to support the loading mechanism.

The base 2 of the machine is provided with endless track crawlers comprising crawler chains 3 which are trained around drive sprockets 4 at one end and idler wheels 5 at the other end. The drive sprockets 4 are mounted on a shaft 12, while the idler wheels 5 are mounted on stub shafts 6 journaled in the crawler frames.

The base or main frame 2 consists of hollow side girders composed of side plates 7 and top channel 8, which are tied together by a transverse plate 9 at the bottom, cross girder 10 at the rear end, shaft 12 and other structural members as are common in the art.

The crawler frames are also of hollow girder construction, and each consists of two side plates 14 and a top plate 15. The crawler frames are pivotally mounted at their rear ends on the shaft 12, and have a plurality of traction wheels 17 journaled at spaced intervals along their length to provide a traction surface for the crawler chains 3. The load received by the main frame or base 2 is transmitted to the crawler frames, and thence through the traction wheels and sprockets to the crawler chains 3 and ground.

The crawler chains 3 are propelled by means of power applied to the drive sprockets 4. The sprockets 4 are provided with beveled gear faces 18 adapted to be connected to any suitable source of power (not shown) carried by the base.

A three-point equalizing suspension for the crawler frames is formed by mounting the crawler frames at their rear ends on the fixed shaft 12 and leaving them free at their forward ends. An equalizing shaft 20 is journaled in suitable bearings in the main frame or base 2 and is connected to the crawler frames through pinions 21–21ª keyed to the shaft, and meshing with racks or gear segments 22–23, respectively, secured to the crawler frames. The gear segments 22 and 23 are on the opposite sides of their respective pinions 21–21ª. The load is equally distributed on each crawler. Therefore, if one crawler is raised higher than the other, the shaft 20 will be rotated due to the gear and rack connection with the crawler frame, and thus the other crawler will be forced down a distance equal to the amount the first crawler was raised.

The shaft 20 is provided with brake drums 25 having brake bands 26 thereon, which bands are adapted to be tightened on the drums by screw shafts 26ª to lock the shaft 20 against rotation when it is desired to form a four-point suspension for the crawler frames.

From the above, it will be readily understood that I have provided an endless track base provided with a novel form of equalizing mechanism that may readily be rendered inoperative when desired to provide a rigid four-point suspension.

It will be understood that while I have shown and described one specific embodiment of my invention, I do not wish to be limited thereto, since various modifications may be made without departing from the scope of my invention as defined in the appended claims.

I claim:

1. In a self-propelled land vehicle having an endless track base, the combination with a main frame, of a pair of crawler frames, said crawler frames being pivotally mounted at their rear ends on a fixed shaft mounted in said main frame and having their forward ends movable vertically relative to said main frame, means for automatically causing the forward ends of said crawler frames to move in opposite vertical direction to equalize the load when traveling over an uneven surface, said means comprising an equalizing shaft journaled in suitable bearings in the main frame, pinions on the opposite ends of said equalizing shaft, gear segments secured to said crawler frame on the opposite sides of said pinions and meshing therewith, whereby if one crawler frame is raised higher than the other, said equalizing shaft will be rotated due to said meshed pinions and gear segments and thus force down the other crawler frame an equal distance.

2. In a self-propelled land vehicle having an endless track base, the combination with a main frame, of a pair of crawler frames, said crawler frames being pivotally mounted at their rear ends on a fixed shaft mounted in said main frame and having their forward ends movable vertically relative to said main frame, means for automatically causing the forward ends of said crawler frames to move in opposite vertical direction to equalize the load when traveling over an uneven surface, said means comprising an equalizing shaft journaled in suitable bearings in the main frame, pinions on the opposite ends of said equalizing shaft, gear segments secured to said crawler frame on the opposite sides of said pinions and meshing therewith, whereby if one crawler frame is raised higher than the other, said equalizing shaft will be rotated due to said meshed pinions and gear segments and thus force down the other crawler frame an equal distance, and means for locking said equalizing shaft against rotation to form a rigid four-point suspension of the main frame when desired.

In testimony whereof I have hereunto set my hand.

FRANK E. SMITH.